United States Patent
Moore

(10) Patent No.: US 9,358,932 B1
(45) Date of Patent: *Jun. 7, 2016

(54) DEVICE AND METHOD FOR TRANSPORTING ELONGATE OBJECTS USING A PICK-UP TRUCK

(71) Applicant: Kevin Moore, Litchfield Park, AZ (US)

(72) Inventor: Kevin Moore, Litchfield Park, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/589,394

(22) Filed: Jan. 5, 2015

Related U.S. Application Data

(63) Continuation of application No. 13/373,788, filed on Nov. 30, 2011, now Pat. No. 8,925,776.

(51) Int. Cl.
*B60R 9/048* (2006.01)
*B60R 9/04* (2006.01)

(52) U.S. Cl.
CPC .. *B60R 9/04* (2013.01); *B60R 9/048* (2013.01)

(58) Field of Classification Search
CPC ................................. B60R 9/048; B60R 9/04
USPC ......... 224/309, 405, 315, 320, 319, 321, 323, 224/324, 325, 42.37, 42.38, 552, 567
See application file for complete search history.

(56) References Cited

U.S. PATENT DOCUMENTS

| | | | |
|---|---|---|---|
| 3,251,519 A | | 5/1966 | Jones |
| 3,836,058 A | * | 9/1974 | Penniman et al. ............ 224/315 |
| 3,877,624 A | | 4/1975 | Carson |
| 4,390,117 A | | 6/1983 | Fagan |
| 4,618,083 A | | 10/1986 | Weger, Jr. |
| 6,290,113 B1 | | 9/2001 | Plyler |
| 6,688,428 B2 | | 2/2004 | Carroll, Jr. |
| 6,763,690 B2 | * | 7/2004 | Galant ................ E05B 73/0082 248/553 |
| 7,311,176 B2 | | 12/2007 | Stevens |

* cited by examiner

*Primary Examiner* — Corey Skurdal
(74) *Attorney, Agent, or Firm* — Booth Udall Fuller, PLC

(57) ABSTRACT

A device for securing ladders to a vehicle having telescoping cross bar having pivotal arms pivotally attached at each end of the telescoping cross bar, respectively, the telescoping crossbar having a receiving portion and an insertion portion, the insertion portion and receiving portion sized such that there is a close fit when inserting the insertion portion into the receiving portion, each pivotable arm has an arm body that includes a pivot arm aperture, at each distal end of the insertion portion and receiving portion are at least one pivot tang, also located at each distal end of the insertion portion and receiving portion is a ladder insertion tang, the ladder insertion tangs are attached to projecting tabs on the distal ends and are inwardly directed, and the receiving portion includes a movement limiting mechanism.

12 Claims, 4 Drawing Sheets

DEVICE AND METHOD FOR TRANSPORTING ELONGATE OBJECTS USING A PICK-UP TRUCK

CROSS REFERENCE TO RELATED APPLICATIONS

This is a continuation of earlier U.S. patent application Ser. No. 13/373,788, entitled "Device and Method for Transporting Elongate Objects Using a Pick-Up Truck" to Kevin Moore, which was filed on Nov. 30, 2011 and is now pending, the entirety of the disclosure of which is hereby incorporated by reference.

FIELD OF THE INVENTION

The present invention relates generally to a device and method used in loading and transporting lengthy objects on a pick-up truck. More specifically, the present invention is a device and method for securing the lengthy objects to the pick-up truck such that they do not easily shift during transportation.

BACKGROUND

Pick-up trucks are designed to safely transport objects of certain dimensions. However, when objects exceed these certain dimensions, they are more likely to shift in transport and even leave the vehicle. This usually occurs when the object is lengthy and has been propped against either the cab or the tailgate of the pickup truck. Examples are found in the transport of ladders, long boards, poles, and other lengthy objects.

Indeed, anyone who has traveled on the highways of an urban area has seen where improperly secured objects, such as ladders, boards and the like, have fallen out of a transporting vehicle and partially, or completely, obstructs the roadway. These are very dangerous situations.

The prior art shows numerous different attempts to address this and other needs. One commonly found solution is a rack that is mounted to the pick-up bed. The rack may or may not include a portion that overhangs the cab of the truck. While this aids in the transport of lengthy objects, it still relies upon the user to properly secure the objects to the rack. Also, for aesthetic and other reasons many vehicle owners will not mount a rack onto the bed of their truck. An example of this type of prior art device is fund in U.S. Pat. No. 5,067,644, issued to Coleman. This patent discloses a load carrying rack that is mounted onto a vehicle roof. The rack includes straps for securing the load to the rack device. Another example of this type of prior art device is illustrated in the drawings contained in U.S. Pat. No. 5,553,760 issued to Wright, et al. Yet another example is found in U.S. Pat. No. 3,884,404, issued to Frost.

Another prior art device is a multi-piece racking systems. An example of a multi-piece rack is found in U.S. Pat. No. 4,630,990, issued to Whiting. In this patent, there are two pieces to the racking system. A front piece that is mounted onto the cab of the truck, and a rear piece that is mounted onto the rear bumper of the truck. The large or long object to be transported is then placed upon the front and rear pieces. Straps are provided on each separate piece to secure the object being transported to the racking system. However, this entails the lengthy process of mounting and dismounting the separate pieces onto the truck. Further, it is a large bulky unit that is undoubtedly expensive and difficult to store. Yet another example is found in U.S. Pat. No. 3,884,404, issued to Frost.

Another type of solution has been to provide devices that are designed to protect specific portions of the truck exterior, such as the cab or the tailgate. An example of a cab protective device is found in U.S. Pat. No. 4,984,837, issued to Dise. This patent discloses a device that is mounted to a side portion of the cab, and extends over the top portion of the cab. Long objects are placed in the bed of the truck such that they extent over the cab and rest upon the device of the Dise patent. There are side arms that project upward to prevent the objects from sliding laterally off of the cab of the truck. Another example is found in U.S. Pat. No. 3,047,161, issued to Thacker. This device is a rack that mounts immediately behind the cab and projects up past the top of the cab. Long objects that extend past the cab are supported over the cab, thereby protecting the surface of the cab. Additionally, as in the Dise patent discussed above, there are portions of the rack that project up past the central portion to prevent unwanted lateral movement of the supported objects.

An example of a tailgate protecting device may be found in U.S. Pat. No. 4,389,067, issued to Rubio. This patent discloses a small rack that is mounted onto a top portion of the tailgate and that projects upward above the tailgate. Thus, objects that are placed in the bed of the truck and that extend past the tailgate rest upon the mounted rack and do not mar the surface of the tailgate. This device does not, however, address the problem of lateral movement of the supported object. Another example of a tailgate protection device may be found in U.S. Design Pat. No. DES. 387,722, issued to Fujinaka. This patent illustrates a device that appears to be mountable onto a top portion of the truck tailgate and that supports transported objects. As with the Fujinaka patent above, this device does not address the problem of lateral movement of the transported object.

Finally, U.S. Pat. No. 4,957,400, issued to Karp discloses a complex system of cab and tailgate protectors used in combination with a series of straps. A cab protector is mounted onto the cab, a tailgate protector is mounted onto the tailgate and the object is supported on the two protectors. Then a series of straps are attached to the truck at a variety of points, such as strap hooks and gutters commonly found on pick-up trucks. These straps securely hold the supported object to the protective devices.

However, there is still a clear and continuing need for devices and methods that aid in the transport of lengthy objects on a pick-up truck.

SUMMARY OF THE INVENTION

It is an object of the present invention to provide a device and method for the transport of lengthy objects on a pick-up truck.

It is another object of the present invention to provide a device and method for the transport of lengthy objects on a pick-up truck that securely holds the transported object and limits unwanted lateral movement of the transported object.

It is a further object of the present invention to provide a device and method for the transport of lengthy objects on a pick-up truck that is small and portable.

It is yet another object of the present invention to provide a small portable device for the transport of lengthy objects that clamps onto the lengthy object for easy use.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
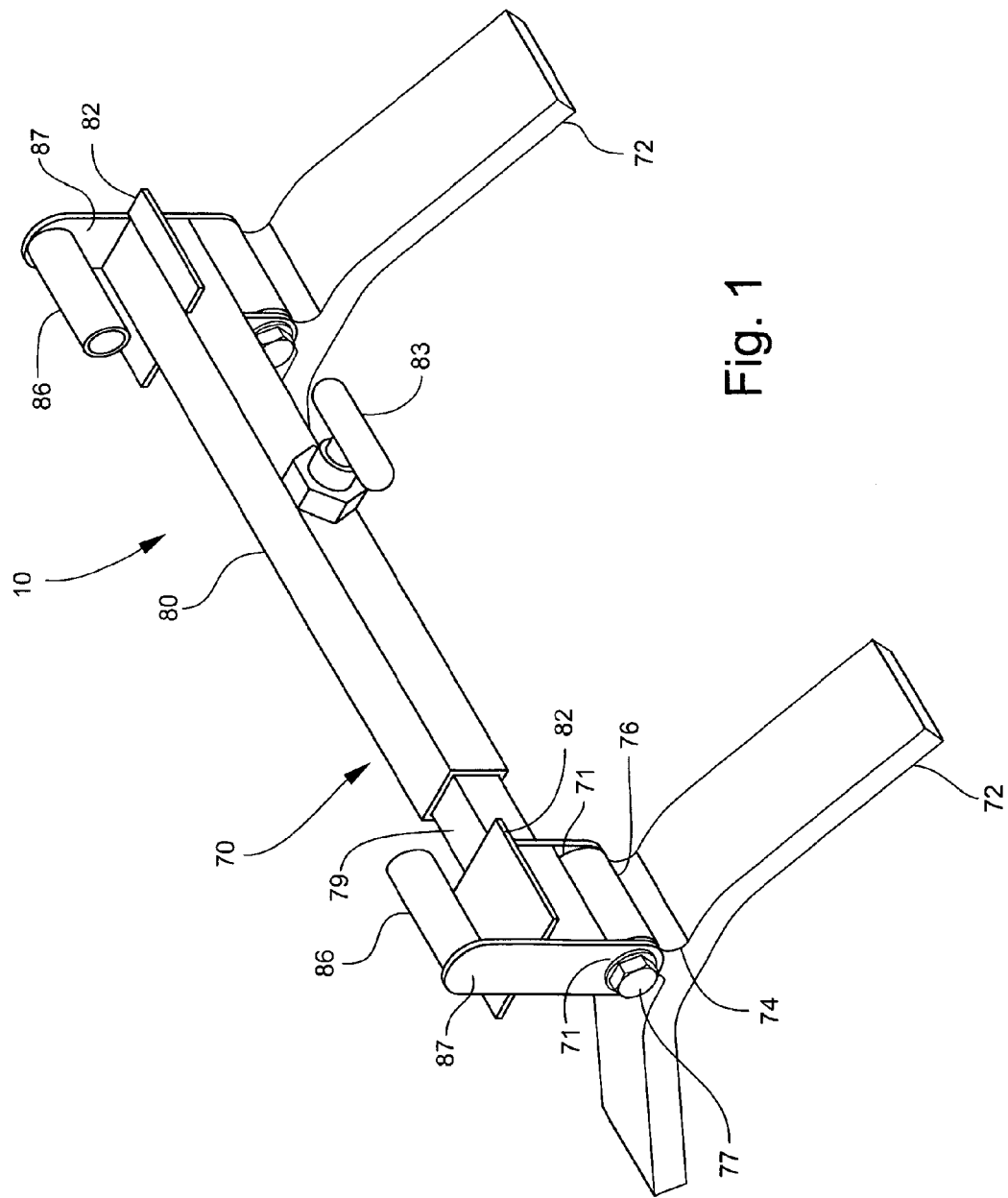
FIG. 1 is a perspective view of the present invention.
Figure 2:
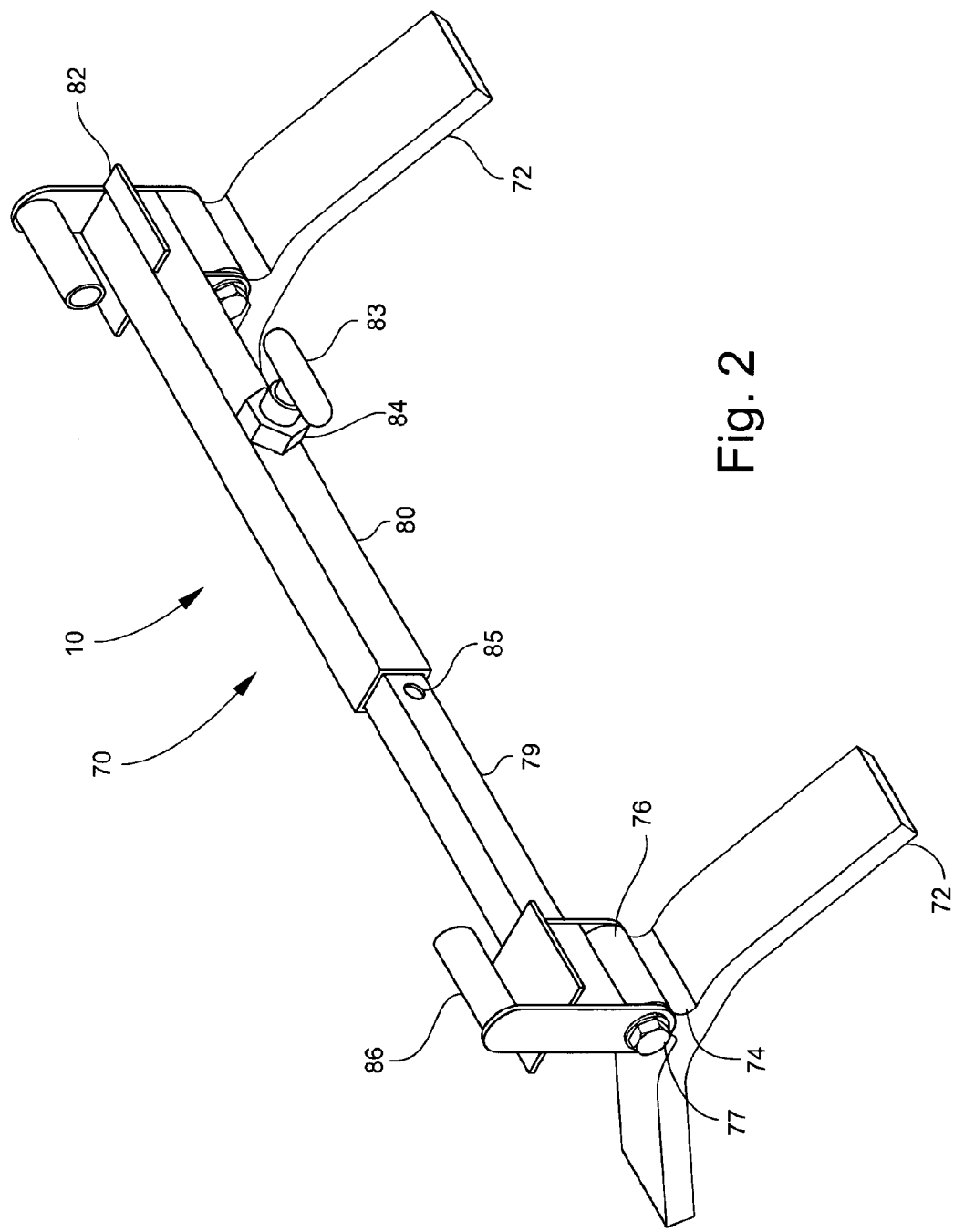
FIG. 2 is a second perspective view of the present invention in an extended position.
Figure 3:
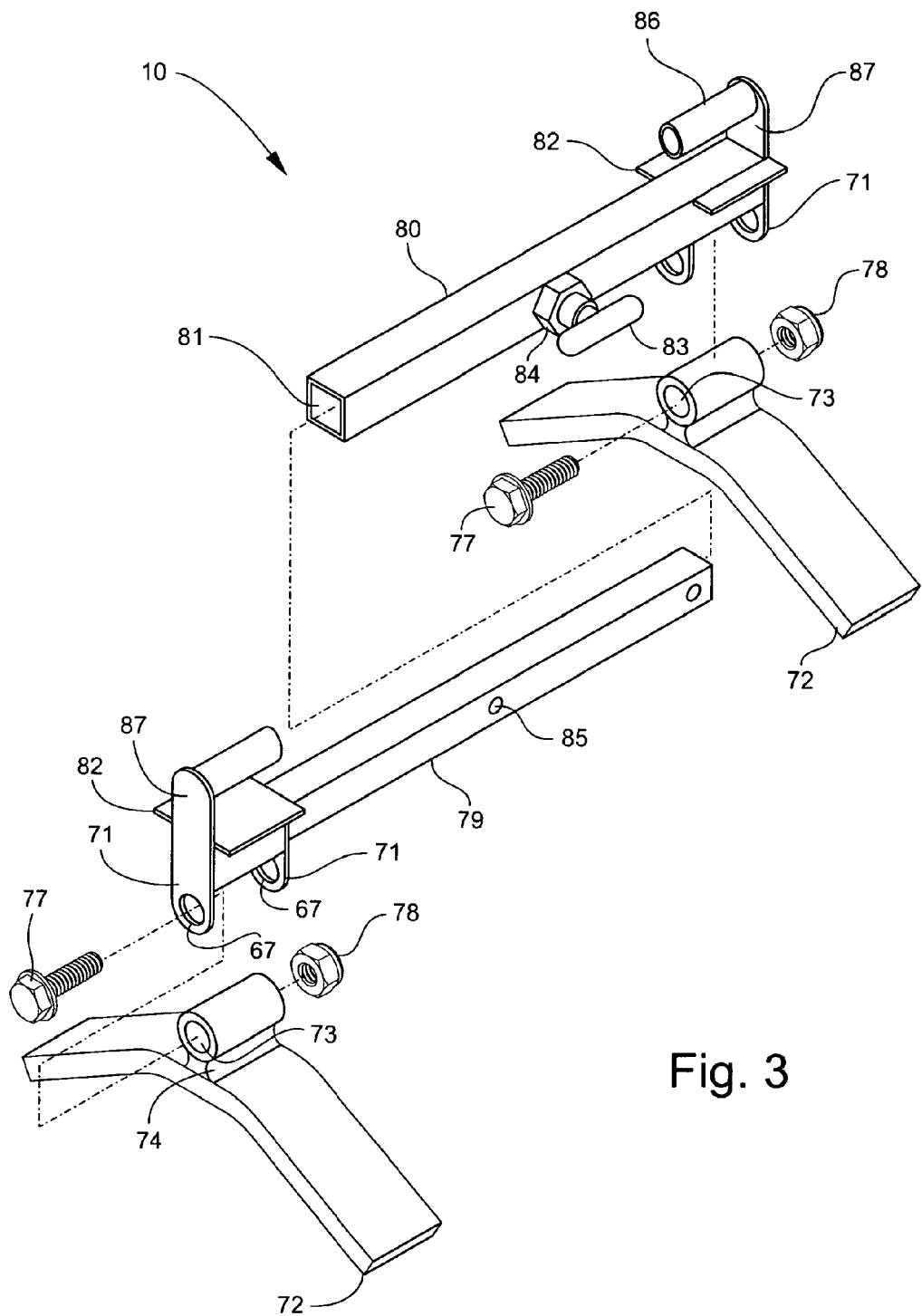
FIG. 3 is an exploded view of the present invention.

The device and method according to the present invention are useful for limiting unwanted movement of lengthy objects being transported by a pick-up truck. More specifically, the present invention helps prevent the loss of these lengthy objects during transport.

With reference to the figures, the device according to the present invention is comprised of a rack device 10 for lengthy object that is used simultaneously on a ladder or other elongated object.

In a preferred embodiment, illustrated in FIGS. 1-4, the device 10 comprises a telescoping cross bar 70 having pivotal arms 72 attached at each end of the telescoping cross bar 70, respectively.

In the preferred embodiment, the telescoping crossbar 70 comprises a receiving portion 80 and an insertion portion 79. The insertion portion 79 and receiving portion 80 are preferably sized such that there is a close fit when inserting the insertion portion 79 into the receiving portion 80. Preferably, the receiving portion 80 includes a movement limiting mechanism 83, such as a fixed nut and bolt (83), or spring loaded plunger (pop pin). When using a spring loaded plunger, the insertion portion 79 should include at least one pin aperture 85 that is capable of lining up with the tip of the spring loaded plunger.

At each distal end of the insertion portion 79 and receiving portion 80 are at least one pivot tang 71. Also located at each distal end of the insertion portion 79 and receiving portion 80 is a movement limiting platform 82 and ladder insertion tangs 86. Preferably the ladder insertion tangs 86 are attached to projecting tabs 87 on the distal ends and are inwardly directed.

Attached at each distal end of the telescoping crossbar 70 are pivotable arms 72. Each pivotable arm 72 has an arm body 74 that includes a pivot arm aperture 67 and at least one, preferably two, arms. In a preferred embodiment, the included angle between two pivot arms is 120°. Also, in a preferred embodiment, each arm has a cushion attached to a surface include in the included angle. The pivot arm body 74 is sized to fit the pivot arm aperture 73 between the pivot tangs 71 thereby allowing the pivot arm aperture 73 to line up co axially with apertures 67 in the pivot tangs 71.

Figure 4:
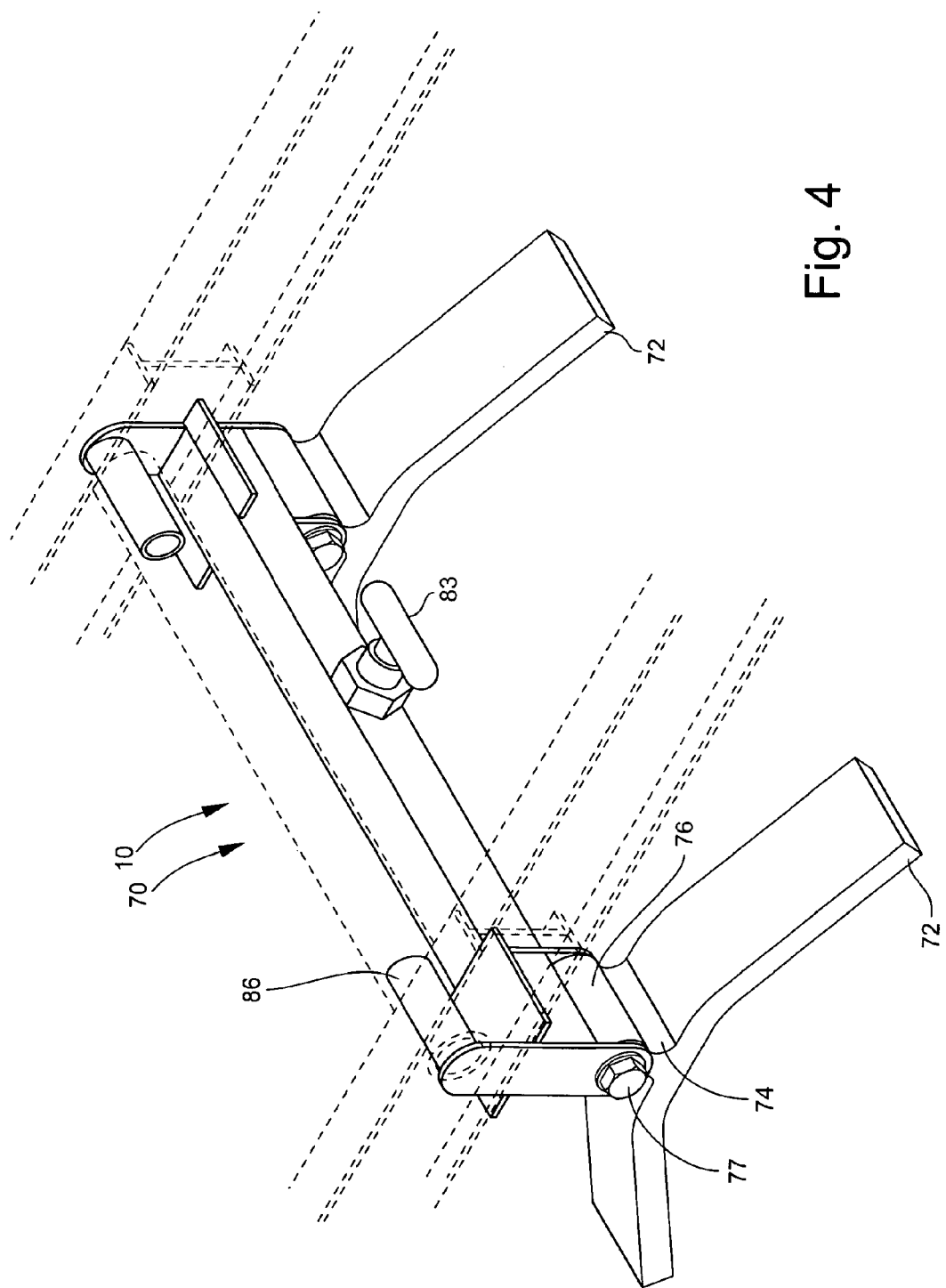
FIG. 4 illustrates the attachment of the present invention to a lengthy object. The ladder is shown crosshatched.

There is a pivot pin 77 that inserts though the lined up pivot arm aperture 73 and pivot tang apertures 67, thereby allowing the pivotable arm 72 to rotate about the pivot pin 77 relative to the telescoping crossbar 70. In one version the pivot pin 77 is a bolt and nut combination, as is illustrated in FIG. 4, but other forms of pivot pins 77 may be used and still fall within the scope of the present invention.

Finally, there is a securing bolt; preferably a T shaped bolt 83 that threads through the threaded aperture 84 and secures insertion portion 79 that has been inserted in the receiving portion 80.

In use, the telescoping crossbar 70 is expanded to a first configuration that is wider than a ladder. The ladder insertion tangs 86 are lined up with an aperture that is located through a ladder rung. The telescoping crossbar 70 is then collapsed to a second configuration wherein the ladder insertion tangs 86 are received and located within the aperture that is located through the ladder rung. The crossbar 70 is then secured into position using the movement limiting mechanism 83, thereby securing the device 10 onto the ladder.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:
1. A device for securing elongate objects to a vehicle, comprising:
    a telescoping cross bar comprising first and second distal ends and a variable length between the first and second distal ends, the telescoping cross bar further comprising:
        a receiving portion comprising a first cross-sectional area, and an insertion portion comprising a second cross-sectional area less than the first cross-sectional area, a length of the insertion portion being inserted within the receiving portion;

a first pivotal arm rotatably coupled directly below the first distal end of the telescoping cross bar, wherein the first pivotal arm is coupled to the telescoping cross bar to rotate in a direction perpendicular to the variable length of the telescoping cross bar;

a second pivotal arm coupled directly below the second distal end of the telescoping cross bar, wherein the second pivotal arm is coupled to the telescoping cross bar to rotate in a direction perpendicular to the variable length of the telescoping cross bar;

a first insertion tang sized to fit in a ladder rung and coupled to the first distal end of the telescoping cross bar by a vertically disposed first projecting tab positioned above the first pivotal arm, the first insertion tang extending from the first projecting tab towards a center of the telescoping cross bar in a direction that is parallel to the telescoping cross bar; and a second insertion tang sized to fit in the ladder rung and coupled to the second distal end of the telescoping cross bar by a vertically disposed second projecting tab positioned above the second pivotal arm, the second insertion tang extending from the second projecting tab towards a center of the telescoping cross bar in a direction that is parallel to the telescoping cross bar.

2. The device of claim 1, wherein the first cross-sectional area and the second cross-sectional area provide a close fit when inserting the insertion portion into the receiving portion.

3. The device of claim 2, wherein the telescoping cross bar further comprises a movement limiting mechanism for fixing a relative position of the insertion portion and the receiving portion of the telescoping cross bar to accommodate a width of the elongate object to be secured to the vehicle.

4. The device of claim 3, wherein the movement limiting mechanism comprises a fixed nut and bolt or spring loaded plunger.

5. The device of claim 1, further comprising:
a first movement limiting platform disposed between the telescoping cross bar and the first insertion tang to prevent unwanted movement of the elongate object coupled to the first insertion tang; and
a second movement limiting platform disposed between the telescoping cross bar and the second insertion tang to prevent unwanted movement of the elongate object coupled to the second insertion tang.

6. The device of claim 1, wherein:
the first pivotal arm is rotatably coupled to the first distal end of the telescoping cross bar with a first pivot pin that is parallel to the telescoping cross bar; and
the second pivotal arm is rotatably coupled to the second distal end of the telescoping cross bar with a second pivot pin that is parallel to the telescoping cross bar.

7. A device for securing elongate objects to a vehicle, comprising:
a cross bar comprising first and second distal ends;
a first pivotal arm rotatably coupled below the first distal end of the cross bar and configured to rotate in a direction perpendicular to the cross bar;
a second pivotal arm coupled below the second distal end of the cross bar and configured to rotate in a direction perpendicular to the cross bar;
a first insertion tang sized to fit in a ladder rung and coupled to the first distal end of the cross bar and disposed above the first pivotal arm, the first insertion tang extending from the first distal end of the cross bar towards a center of the cross bar; and
a second insertion tang sized to fit in the ladder rung and coupled to the second distal end of the cross bar and disposed above the second pivotal arm, the second insertion tang extending from the second distal end of the cross bar towards a center of the cross bar.

8. The device of claim 7, wherein the cross bar is a telescoping cross bar comprising a variable length between the first and second distal ends, the cross bar further comprising:
an insertion portion that comprises a first cross-sectional area defined by an outer surface of the insertion portion; and
a receiving portion that comprises a second cross-sectional area greater than the first cross-sectional area, the second cross-sectional area defined by an inner surface of the receiving portion to provide a close fit when inserting the insertion portion into the receiving portion.

9. The device of claim 8, wherein the cross bar further comprises a movement limiting mechanism for fixing a relative position of the insertion portion and the receiving portion of the cross bar to accommodate a width of the elongate object to be secured to the vehicle.

10. The device of claim 9, further comprising:
a movement limiting platform disposed between the cross bar and the first insertion tang to prevent unwanted movement of the elongate object coupled to the first insertion tang.

11. The device of claim 7, wherein:
the first pivotal arm is rotatably coupled to the first distal end of the cross bar with a first pivot pin that is parallel to the cross bar; and
the second pivotal arm is rotatably coupled to the second distal end of the cross bar with a second pivot pin that is parallel to the cross bar.

12. The device of claim 7, further comprising:
a first projecting tab coupled between the first distal end of the cross bar and the first insertion tang, the first projecting tab oriented perpendicular to the cross bar; and
a second projecting tab coupled between the second distal end of the cross bar and the second insertion tang, the second projecting tab oriented perpendicular to the cross bar.

* * * * *